(12) United States Patent
Rivas

(10) Patent No.: US 10,330,206 B2
(45) Date of Patent: Jun. 25, 2019

(54) MOVABLE SHUTTER FOR A FLUID CONDUIT

(71) Applicant: ONIS, Lambesc (FR)

(72) Inventor: Jerome Rivas, Charleval (FR)

(73) Assignee: ONIS, Lambesc (FR)

( * ) Notice: Subject to any disclaimer, the term of this patent is extended or adjusted under 35 U.S.C. 154(b) by 0 days.

(21) Appl. No.: 15/269,206

(22) Filed: Sep. 19, 2016

(65) Prior Publication Data

US 2017/0082208 A1 Mar. 23, 2017

(30) Foreign Application Priority Data

Sep. 18, 2015 (FR) ..................................... 15 58837

(51) Int. Cl.
*F16K 3/30* (2006.01)
*F16K 35/00* (2006.01)
*F16K 3/312* (2006.01)

(52) U.S. Cl.
CPC ................ *F16K 3/30* (2013.01); *F16K 3/312* (2013.01); *F16K 35/00* (2013.01)

(58) Field of Classification Search
CPC .......... F16K 35/02; F16K 35/022; F16K 3/30; F16K 3/312; F16K 3/10; F16K 3/16; F16K 3/20; F16K 3/202; F16K 3/205; F16K 3/207
USPC ......... 251/326–329, 92, 170, 159, 167, 168, 251/169
See application file for complete search history.

(56) References Cited

U.S. PATENT DOCUMENTS

| 2,462,494 | A | | 2/1949 | Hamer | |
|---|---|---|---|---|---|
| 2,805,836 | A | * | 9/1957 | Taylor | ....................... F16K 3/04 251/177 |
| 3,613,720 | A | | 10/1971 | Welch | |
| 3,738,610 | A | | 6/1973 | Hale, Sr. | |
| 2014/0083546 | A1 | * | 3/2014 | Joki | ........................ F16K 3/312 138/94.3 |

FOREIGN PATENT DOCUMENTS

FR 2733024 A1 10/1996
WO 92/14957 A1 9/1992

OTHER PUBLICATIONS

International search Report & Written Opinion for French Application No. FR 1558837, dated Jul. 7, 2016, 6 Pages.

\* cited by examiner

*Primary Examiner* — Michael R Reid
(74) *Attorney, Agent, or Firm* — Brooks Kushman P.C.

(57) ABSTRACT

A movable shutter for a fluid conduit including two half-bodies consisting of a tube that forms a conduit, to the ends of which are affixed a flange and a plate having a bearing surface; a gate with a body defined by two longitudinal surfaces located opposite the bearing surfaces, which gate is mounted movably between the bearing surfaces, between a closed position and an open position; and a locking mechanism suitable for keeping the plates in a position in which they are either separated or close together, wherein at least one protruding element is provided on at least one of the bearing surfaces or on at least one of the longitudinal surfaces, such that if the gate is not properly positioned, the protruding element forms an obstacle that prevents the locking mechanism from keeping the plates in the position in which they are close together.

18 Claims, 10 Drawing Sheets

MOVABLE SHUTTER FOR A FLUID CONDUIT

CROSS REFERENCE TO RELATED APPLICATION

The present application claims priority to French patent application No. FR 15 58837, which was filed on Sep. 18, 2015.

BACKGROUND OF THE INVENTION (1) Field of the Invention

The invention relates to the technical field consisting of equipment for various pipe networks, including, in particular, hydrocarbon refineries, gas-processing plants, and even petrochemical factories. The invention relates specifically to a movable shutter for a fluid conduit, a fluid-treatment facility, and a procedure for the secure closure of a movable shutter for a fluid conduit.

(2) Description of Related Art

Many currently known sliding shutters allow fluid conduits to be equipped in such a way that they can shift from an open position to a closed position or vice-versa. For example, document FR 2733024 proposes the sliding shutter shown in FIGS. 1, 2, 3, 4a, and 4b. It is composed of:

two half-bodies 2, 3 associated with a locking mechanism that allows them to be brought close together or separated from each other. Each of the half-bodies 2, 3 includes a tube 21, 31 that forms a conduit and allows the passage of the fluid. Each of the ends of the tube 21, 31 is secured respectively to a flange 22, 32 and to a plate 23, 33. Each plate 23, 33 has a rear surface that is connected to the tube 21, 31, as well as a bearing surface 231, 331; and a flat gate 1, shown in greater detail in FIG. 5, which is movably mounted between the bearing surfaces 231, 331 of the plates 23, 33. The gate 1 is composed of a body 11 divided into two parts that are symmetrical in relation to the transverse median plane 14. The body 11 has two flat longitudinal surfaces 111, 112 that are parallel to each other. The first portion 12 is a solid portion that, in a closed position (see FIG. 4a) blocks the conduit in such a way as to prevent the flow of fluid between the two half-bodies 2, 3. Fittings 121 are provided on each of the longitudinal surfaces 111, 112, which fittings are suitable for being aligned with the tubes 21, 31 when the shutter 1 is in the closed position. The second portion 13 is a portion that is pierced by an opening 131 whose edges are flush with each of the longitudinal surfaces 111, 112. In the open position (see FIG. 4b), the pierced portion 13 is positioned at the center of the conduit, aligned with the tubes 21, 31, so as to allow the circulation of fluid between the two half-bodies 2, 3.

The locking mechanism is composed of four clevis fasteners 6a, 6b, 6c, 6d that are parallel to the axis of the half-bodies 2, 3 and that are joined to the half-bodies by means of:

two drive shafts 4a, 4b, affixed to a first half-body 2; and
two driven shafts 5a, 5b affixed to the second half-body 3.

The rotation of the drive shafts 4a, 4b causes the half-bodies 2, 3 to move closer together or farther apart. The simultaneous rotation of the two drive shafts 4a, 4b is ensured thanks to two cranks that form an integral part of one of the ends of each of the shafts 4a, 4b. The cranks are connected to each other by a tie rod 7. A lever 8 that forms an integral part of one of the cranks allows the rotational movement to be performed.

The locking mechanism is suitable for allowing the half-bodies 2, 3 to shift from a position in which they are separated from each other to a position in which they are close to each other. In FIGS. 1 and 3, the locking mechanism holds the plates 23, 33 in a separated position in which the bearing surface 231, 331 of the plates is spaced apart from the respective longitudinal surface 111, 112 of the gate 1. This configuration allows the gate 1 to be shifted between the closed and open positions.

After the locking mechanism has been actuated, the half-bodies 2, 3 are in the position shown schematically in FIGS. 2, 4a, and 4b, in which they are close together. In this close position, the bearing surfaces 231, 331 clamp together the body 11 in a leakproof manner so as to hold the gate 1 in the open or closed position. Each of the bearing surfaces 231, 331 comes into close contact with the respective longitudinal surface 111, 112 of the gate 1. FIG. 4a is a schematic representation of the case in which the gate 1 is in the closed position, while FIG. 4b shows the case in which the gate 1 is in the open position.

Document FR 2733024 also describes seals 9 that are located on both of the longitudinal surfaces 111, 112 of the gate 1. These seals 9 are located around the opening 131 and around the fitting 121.

The movable shutter described above has the disadvantage of providing no way to confirm the proper position of the gate between the two plates. Indeed, poor positioning can have serious consequences for the facility, causing fluid leaks and endangering the operators.

Document WO 9214957 describes a movable shutter that makes it possible to avoid some of the above-mentioned disadvantages. It proposes a system that allows the position of the gate to be secured. The system is composed of a locking pin that can sink into two holes provided in the lateral surfaces of the body of the gate, with the position of these holes corresponding respectively to the open position and the closed position of the shutter. This safety system prevents the gate from being shifted whenever the half-bodies are not completely released in the second position. However, such a system is difficult to implement, because the holes in the gate must be formed in very specific positions. Furthermore, the installation and use of the locking pin are complex, because the operator must place the pin in the proper hole.

Other documents were also consulted, namely, documents U.S. Pat. Nos. 3,738,610, 2,462,494, and 3,613,720.

Document U.S. Pat. No. 3,738,610 describes a valve that is actuated by a pivoted bi-faced tap. A flange extends axially from a ring that defines a groove on both sides of the ring. A ring of flexible sealing material is secured in the ring. Part of the ring facing the flexible seal rings includes annular beads, each having a peak and whose sides slope toward the planar surface of the corresponding ring. Planar sealing surfaces of the flange may be clamped against similar planar sealing surfaces on the seating ring secured to each valve body, so as to ensure leakproofness.

Document U.S. Pat. No. 2,462,494 describes a pipeline fitting with sealing means provided with peripheral annular shoulders on internal planar surfaces. The peripheral annular shoulders cooperate with sections of the body in order to ensure leakproofness. The pipeline fitting includes a part that forms an orifice plate and a blinding plate, which can tilt and pivot.

Document U.S. Pat. No. 3,613,720 describes a swinging check valve in which a part forming a valve shutter has a flap with a seal equipped with tabs that ensure the proper alignment of a valve-body seat and a clamping connective assembly.

BRIEF SUMMARY OF THE INVENTION

The invention seeks to remedy the limitations of the known movable shutters. In particular, one goal of the invention is to provide a movable shutter that allows the operator easily to ensure that the gate is properly positioned.

Another goal of the invention is to provide a movable shutter whose manufacture and installation have been simplified, thereby reducing its production costs.

Yet another goal of the invention is to provide a movable shutter that makes it possible to shift easily from a closed position to an open position and vice-versa.

The solution proposed by the invention is a movable shutter for a fluid conduit including:

two half-bodies disposed so as to form a fluid conduit, with each of the half-bodies being formed by a tube that forms a conduit, to the ends of which are affixed respectively a flange and a plate, with each of the plates having a bearing surface;

a gate in the form of a body defined by two flat facing longitudinal surfaces, each of which is located respectively opposite the bearing surface of the plates, which gate has a solid portion and a portion that is pierced by an opening hose edges are flush with each of the longitudinal surfaces, with the gate being mounted movably between the bearing surfaces between:

a closed position in which the solid part blocks the conduit in such a way as to prevent the flow of fluid between the two half-bodies; and an open position in which the pierced portion is positioned at the center of the conduit, so as to allow the circulation of fluid between the two half-bodies, a locking mechanism suitable for keeping the plates in:

a position in which they are separated, in which the bearing surface of the plates is spaced apart from the respective longitudinal surface of the gate, so as to allow the gate to be shifted between the closed and open positions; and a position in which they are close together, in which the bearing surfaces clamp together, in a leakproof manner, the body of the gate so as to hold the gate in the open position or in the closed position, with each of the bearing surfaces coming into close contact with the respective longitudinal surface of the gate.

This invention is noteworthy in that at least one relief element, such as for example a protrusion, is provided on the bearing surface of at least one plate or on at least one of the longitudinal surfaces of the body of the gate, with the protruding element being configured such that if the gate is not properly positioned in the closed position or in the open position, the protruding element forms an obstacle that keeps the bearing surface of at least one plate away from the respective longitudinal surface, such that the locking mechanism cannot keep the plates in the position in which they are close together.

Such a device allows the operator to ensure that the gate is in the desired position. Indeed, whether the gate is in the open position or in the closed position, proper alignment of the gate with the tubes of the half-bodies is necessary in order to prevent any fluid leaks. Thanks to the invention, the operator cannot fully operate the locking mechanism unless the gate has been properly positioned.

Other advantageous characteristics of the invention are listed below. Each of these characteristics may be considered either alone or in combination with the notable characteristics described hereinabove, and, if appropriate, may be the subject of one or more divisional patent applications:

the protruding element may be provided on at least one of the longitudinal surfaces of the body of the gate, which protruding element is located between the solid portion and the pierced portion of the body, such that if the gate is positioned in such a way that the protruding element is located in the space between the two bearing surfaces of the plates, the protruding element maintains a space between the longitudinal surface on which it is located and the respective bearing surface;

the protruding element may be provided on at least one of the longitudinal surfaces of the body of the gate, and the protruding element may be configured such that in the close-together position, the space between the two bearing surfaces of the plates is less than the combined thickness of the body and of the protruding element;

a protruding element may be provided on each of the two longitudinal surfaces of the body of the gate;

the protruding element may be positioned at the center of the body of the gate;

the protruding element may be symmetrical in relation to the longitudinal median plane of the body of the gate;

the protruding element may be symmetrical in relation to the transverse median plane of the body of the gate;

the protruding element may be in the shape of an hourglass, with two straight sides that are parallel to the longitudinal edges of the body of the gate, which straight sides are linked by two curved sides;

the protruding element may be in the form of a transverse rib extending over the entire width of the body of the gate, or substantially over the entire width of the body;

the protruding element may be in the form of a plurality of ribs that are aligned transversely in relation to each other over the width of the body of the gate;

the protruding element may be in the form of a transverse rib that is located at the center of the body, with the length of the rib being less than the width of the body;

the protruding element and the body of the gate may be in the form of a single piece;

the protruding element may be affixed to the body of the gate, and the protruding element may be held in position on the body by attachment means;

the protruding element may be provided on the bearing surface of at least one of the plates, with a recess whose shape corresponds to that of the protruding element being provided on the respective longitudinal surface of the body of the gate, such that if the protruding element is not positioned in the recess, the protruding element forms the obstacle;

the protruding element and the plate on whose bearing surface it is provided may be in the form of a single piece;

the protruding element may be affixed to the bearing surface of the plate, with the protruding element being held in position on the bearing surface by attachment means; and the protruding element may be between 0.5 mm and 5 mm thick.

BRIEF DESCRIPTION OF THE SEVERAL VIEWS OF THE DRAWINGS

Other advantages and characteristics of the invention will be better understood through a reading of the following description of a preferred embodiment, with reference to the accompanying drawings, which are provided as illustrative and non-limitative examples, and on which:

The above-mentioned

The above-mentioned

The above-mentioned

The above-mentioned

The above-mentioned

The above-mentioned

FIGS. 7a through 7d are variants of the embodiment of the gate shown in FIG. 6a;

DETAILED DESCRIPTION OF THE INVENTION

Figure 6A:
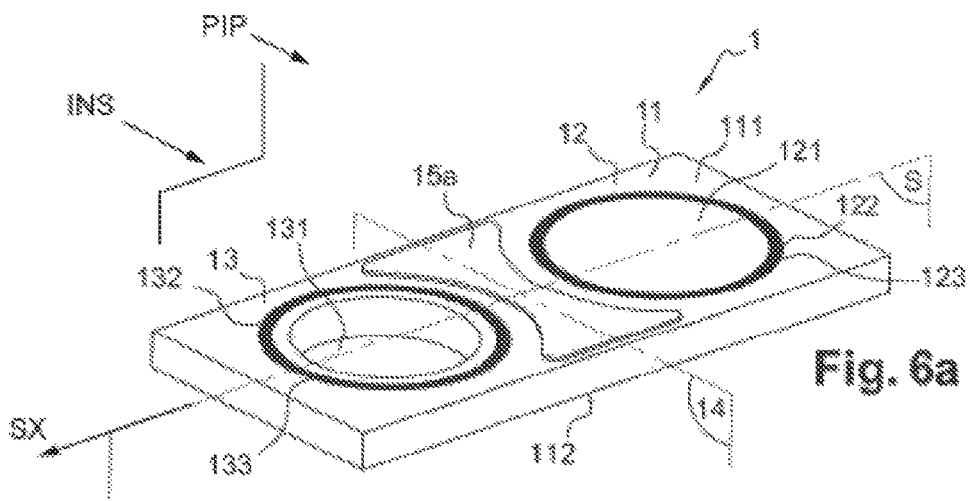
FIGS. 6a, 6b, and 6c are schematic representations of a fluid-treatment facility and of gates according to the invention.

FIG. 6a shows a fluid-treatment facility (INS) according to the invention. The INS facility includes at least one fluid conduit (PIP) that is provided with at least one movable shutter 1.

The movable shutter that is the subject of the invention is similar to the one that exists in the prior art and that was described earlier with reference to FIGS. 1, 2, 3, 4a, and 4b. The inventive activity lies in the manner in which the gate 1 or the bearing surface 231, 331 of the plates 23, 33 is provided, which manner makes it possible to ensure that the gate is properly positioned, by preventing the locking mechanism from keeping the half-bodies 2, 3 in the close-together position, thereby preventing any risk of fluid leaks.

When the shutter is installed, the flanges 22, 32 of each of the half-bodies 2, 3 are connected to the fluid conduit in such a way that the conduit is aligned with the tubes 21, 31. The flanges 22, 32 are then joined to the conduit by attachment means, such as bolts, welding, or screws. In the separated position, each of the bearing surfaces 231, 331 of the plates 23, 33 faces the respective longitudinal surface 111, 112 of the gate 1 when the gate is slid into the space between the two half-bodies 2, 3.

Figure 6B:
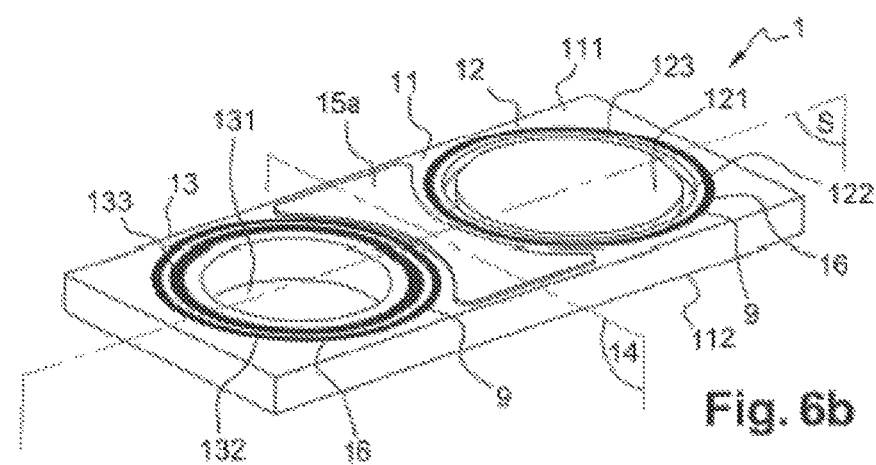
Figure 6C:
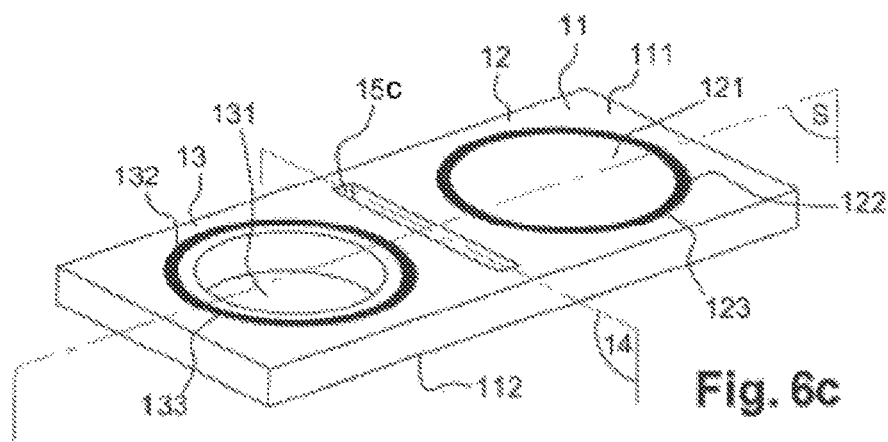

A gate 1 according to the invention is shown in FIGS. 6a, 6b, and 6c. It includes a body 11 that is preferably in the form of a rectangular parallelepiped, but which may be in other forms, such as, for example, a cube or an entirely different parallelepiped. It is made of a rigid and waterproof material such as aluminum, stainless steel, or a type of plastic. The width of the body 11 of the gate may be between 4 cm and 65 cm; its length may be between 15 cm and 300 cm; and its thickness may be between 1 cm and 15 cm.

The gate 1 is divided into two parts 12, 13 that are symmetrical in relation to the transverse median plane 14 and that are aligned with respect to each other on the sagittal plane (S) of the body 11. The first part 12, which is also known as the solid portion, has a circular fitting 121 that is preferably located on the two longitudinal surfaces 111, 112. This fitting 121 is surrounded by a circular groove 122. The depth of this groove ranges from 0.3 cm to 2 cm, and its width may range, for example, from 0.3 cm to 2 cm. The dimensions of the fitting 121 correspond to the cross-section of the tubes 21, 31. The diameter of the fitting 121 is, for example, between 2 cm and 40 cm.

The second part 13, which is also known as the pierced portion, has an opening 131 whose shape is equivalent to that of the fitting 121. The opening 131 is surrounded by a circular groove 132 that has the same dimensions as the groove 122.

Annular seals 123 and 133 are inserted respectively into the grooves 122 and 132. These seals 123, 133 may have a circular cross-section, but may also have a rectangular or even triangular cross-section. They are preferably made of a flexible material such as rubber, fluorinated rubber, or polyethylene, but may also be made of graphite, silicone, or even polyurethane. Their thickness is preferably substantially greater than the depth of the grooves 122, 132, so as to extend beyond them and make it possible to obtain a better seal when the bearing surfaces 231, 331 of the plates 23, 33 come into contact with the respective longitudinal surfaces 111, 112 of the gate 1 when the plates are in the close-together position. This thickness is, for example, between 3 mm and 25 mm.

In the embodiment shown in FIG. 6b, the gate 1 also has other grooves 16 that are concentric with the circular grooves 122, 132. These grooves 16 are circular, and their diameter is substantially greater than that of the grooves 122, 132. This diameter is between 8 cm and 110 cm. These grooves 16 are preferably provided on both of the longitudinal surfaces 111, 112 of the gate 1, but may also be present on only one of the surfaces. These grooves 16 make it possible to install, either temporarily or permanently, annular seals 9 that are suitable for making the system fireproof. These seals 9 are made of a non-inflammable material, such as, for example, graphite.

All of the grooves 122, 132, 16 are formed by a bottom and an opening, which are connected by lateral walls. They may, for example, have a U-shaped or C-shaped cross-section, with the bottom and the opening having the same dimensions. However, they may also have a shape in which the opening is narrower than the bottom, so that once their seal has been force fitted, it cannot accidentally fall out.

In the embodiments, at least one fool-proofing keying relief element, known as the "protruding element" 15a, 15b, made of a rigid material, is provided on at least one bearing surface 231, 331 of at least one plate 23, 33, or on at least one of the longitudinal surfaces 111, 112 of the body 11 of the gate 1.

Each protruding element 15a, 15b is configured such that in the close-together position, the space between the two bearing surfaces 231, 331 of the plates 23, 33 is less than the combined thickness of the body 11 and of the protruding element 15a, 15b.

Accordingly, if the gate 1 is not properly positioned in the space between the two half-bodies 2, 3 in the closed position or in the open position, the protruding element 15a, 15b forms an obstacle that prevents the undesirable proximity of the respective bearing surfaces and longitudinal surfaces, locking the plates 23, 33 and thereby preventing the close-together position and the leakproof clamping of the body 11.

For example, the gate 1 is equipped with a positioning safety device that is composed of at least one protruding element 15a, 15b provided on at least one of the longitudinal surfaces 111, 112 of the body 11 of the gate 1 or on the bearing surface 231, 331 of at least one plate 23, 33. Several embodiments of the positioning safety device will now be described in detail.

In the closed position (e.g., in FIG. 9a) the movable gate 1 blocks the conduit in such a way as to prevent the flow of fluid between the two half-bodies. In the open position (e.g., in FIG. 9b), the pierced portion 13 is positioned at the center of the conduit, aligned with the tubes 21, 31, so as to allow the circulation of fluid between the two half-bodies 2, 3.

First Embodiment (FIGS. 6a-6b, 7a-7d, 8, 9a-9b, and 10)

In the embodiments shown in FIGS. 6 through 10, the gate 1 is mounted in such a way that it can slide along a rectilinear translational direction (SX) (see FIG. 6a) that is parallel to the longitudinal median plane (S) and to the longitudinal surfaces 111, 112 of the body 11. The rectilinear translational direction (SX) is also perpendicular to the transverse median plane 14.

Thus, the sliding gate 1 can be shifted in the rectilinear translational direction (SX); that is, the gate moves between the bearing surfaces 231, 331 by means of rectilinear translation (namely, a straight linear slide) in the space between the two half-bodies 2, 3.

In this embodiment, the protruding element 15a is provided on at least one of the longitudinal surfaces 111, 112 of the body 11 of the gate 1. However, a protruding element 15a may be provided on each of the two longitudinal surfaces 111, 112.

The protruding element 15a is located between the solid portion 12 and the pierced portion 13. It is advantageously placed at the center of the body 11, symmetrically with respect to the transverse median plane 14 and/or with respect to the longitudinal median plane (S), and may be provided in various forms. FIGS. 7a through 7d show various different examples of protruding elements 15a. It may be provided in the form of an hourglass (see FIG. 7a). In this configuration, the element 15a has two straight sides 151a, 152a that are parallel to the sagittal plane (S) (or the longitudinal median plane) of the body 11. These straight sides 151a, 152a are linked by curved sides 153a, 154a. The latter sides follow, for example, the shape of the solid portion and 12 and the pierced portion 13, or the shape of the plates 23, 33, which facilitates the proper positioning of the gate.

The protruding element 15a may also be provided in various different forms. For example, it may be provided in the form of a transverse rib (see FIGS. 7b and 7d) extending over all or part of the width of the body 11. This rib may be provided in various different forms, such as, for example, a rectangular parallelepiped or even a cube. Its length may be less than the width of the body 11 (see FIG. 7d). Alternatively, its length may be equal to the width of the body 11. In the preferred embodiment shown in FIG. 7b, the length of the rib corresponds substantially to the width of the body 11. The word "substantially" refers to the fact that the length of the rib may be a few millimeters less than the width of the body 11.

Figures 7A, 7B, 7C, 7D:
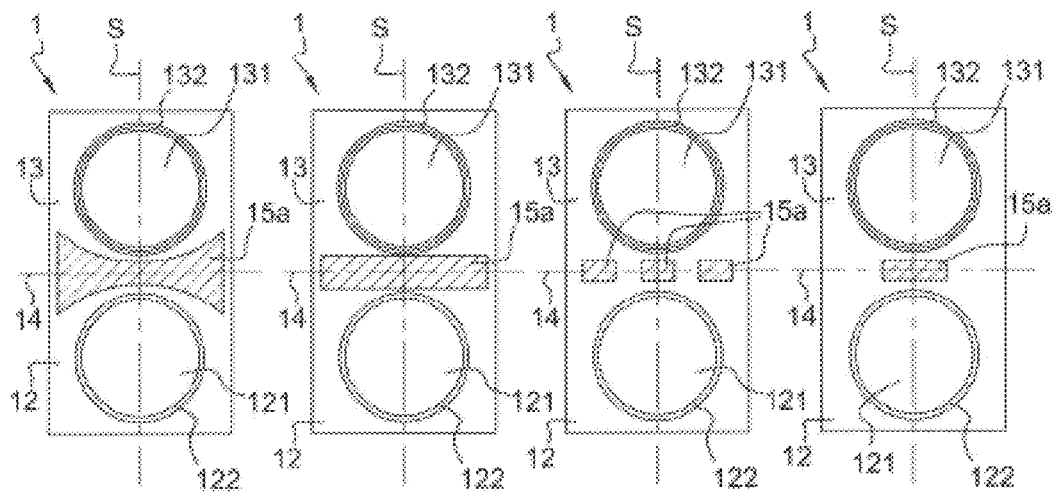

In FIG. 7c, the protruding element 15a may be in the form of a plurality of ribs that are aligned transversely in relation to each other over the width of the body 11. FIG. 7c shows three ribs. However, the gate 1 may have a different number of ribs, ranging from 2 to 15. These ribs are aligned transversely and are located at the center of the body 11.

The thickness of the protruding element 15a ranges from 0.5 mm to 20 mm, and preferably from 0.5 mm to 5 mm. Its length is between 2 cm and 65 cm, and its width may vary from 0.5 cm to 10 cm.

For example, in the embodiments shown in FIGS. 6a-c and 7a-b, the width of the protruding element 15a is equal at least to the diameter of the openings 131 or of the fitting 121 that forms the blinding plate.

The protruding element 15a and the body 11 may be provided in the form of a single piece, using, for example, a molding, stamping, or machining process. It may also be affixed to the body 11 at a later time, through the use of attachment means such as glue, welds, or screws. This two-part solution allows the use of different materials for the body 11 and for the protruding element 15a. For example, the latter part may be made of a material that is more rigid than the one used for the body 11.

For example, the protruding element 15a is symmetrical in relation to the transverse median plane 14, such that it is equidistant from the solid portion 12 and from the pierced portion 13. However, it may be positioned differently, depending on the operator's requirements.

Figure 8:
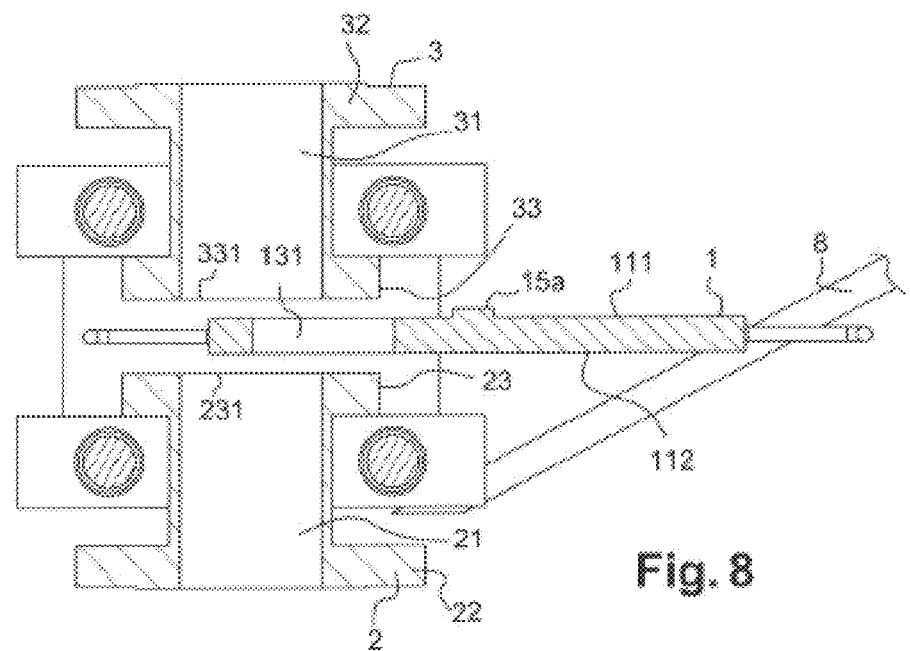
FIG. 8 is a schematic representation of a shutter according to the invention, with the half-bodies in the separated position.

FIG. 8 shows the shutter in the separated position, with the two half-bodies 2, 3 spaced apart from each other. In this separated position, the gate 1 is free to shift into the space that exists between the two plates 23, 33, from the open position to the closed position or vice-versa. In this separated position, the space between the two bearing surfaces 231, 331 of the plates 23, 33 is greater than the combined thickness of the body 11 and the protruding element 15a, thereby enabling the shifting of the gate 1. The bearing surface 231, 331 of each of the plates 23, 33 is located opposite the respective longitudinal surface 111, 112 of the gate 1.

Figure 9A:
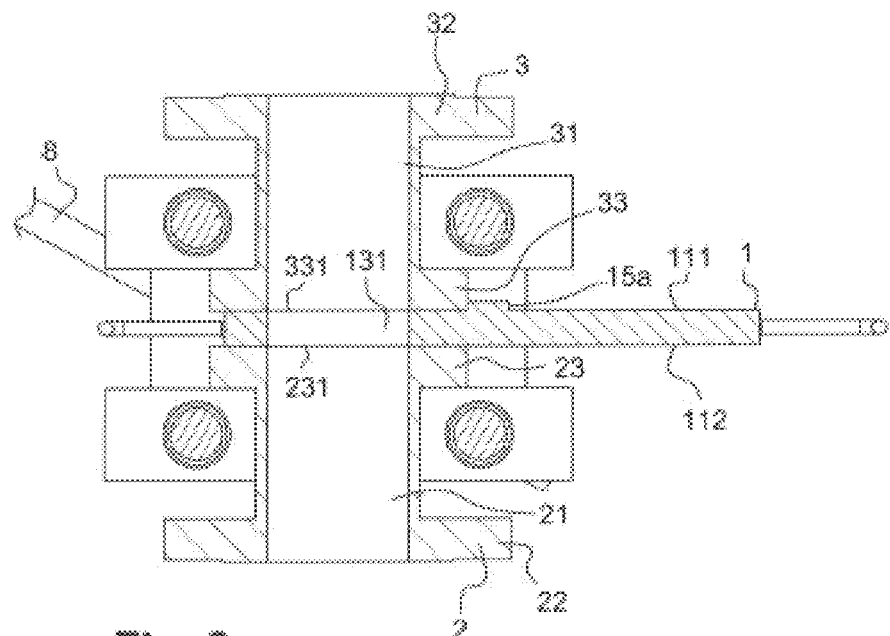
FIG. 9a is a schematic representation of the shutter shown in FIG. 8, in which the half-bodies are in the close-together position and the gate shown in FIG. 6a is in the open position.
Figure 9B:
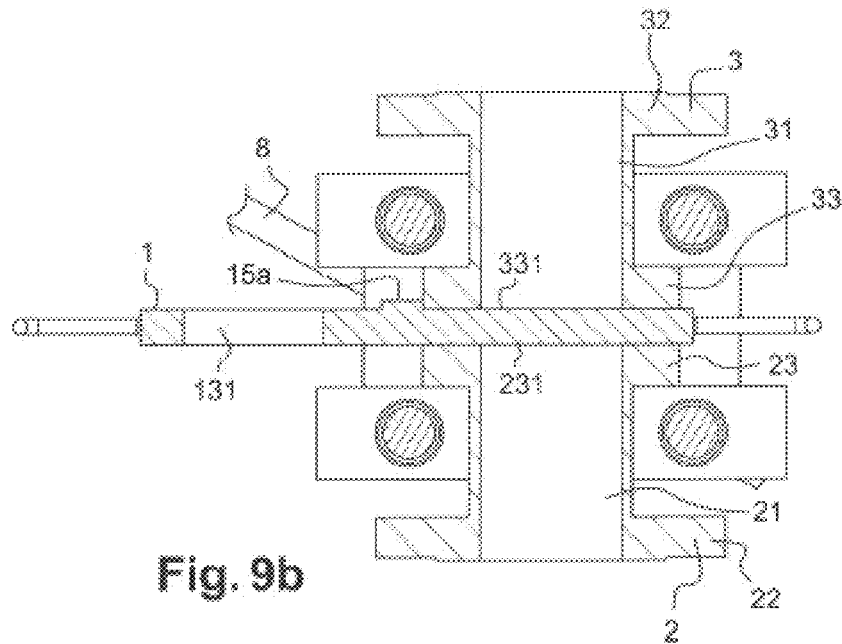
FIG. 9b is a schematic representation of the shutter shown in FIG. 8, in which the half-bodies are in the close-together position and the gate shown in FIG. 6a is in the closed position.

FIGS. 9a and 9b show the shutter with the plates 23, 33 in the close-together position, after the gate 1 has been placed in the closed ("fluid blocked") position shown in FIG. 9b, or in the open ("fluid passage") position shown in FIG. 9a.

In FIG. 9a, the shutter 1 is in the open position, with the bearing surfaces 231, 331 of the plates 23, 33 coming into contact respectively with each of the longitudinal surface 111, 112 of the gate 1 in such a way that the opening 131 is coaxial with the tubes 21, 31 at the center of the conduit. This configuration enables a leakproof connection of the fluid conduit between the two half-bodies 2, 3.

In FIG. 9b, the shutter 1 is in the closed position, and the fitting 121 is coaxial with the tubes 21, 31. The bearing surfaces 231, 331 respectively come into contact with the longitudinal surface 111, 112 of the body 11 so as to lock it into position. This configuration prevents any communication of fluid between the two half-bodies 2, 3.

The locking mechanism is used in order to bring the plates 23, 33 together and to lock the gate 1 in position between the two bearing surfaces 231, 331. FIGS. 9a and 9b illustrate the case in which the gate 1 has been properly positioned, and the opening 131 and the fitting 121 are respectively coaxial with the tubes 21, 31. The locking mechanism is locked, and can keep the half-bodies 2, 3 in the close-together position, only when the gate 1 is correctly positioned.

Figure 1:
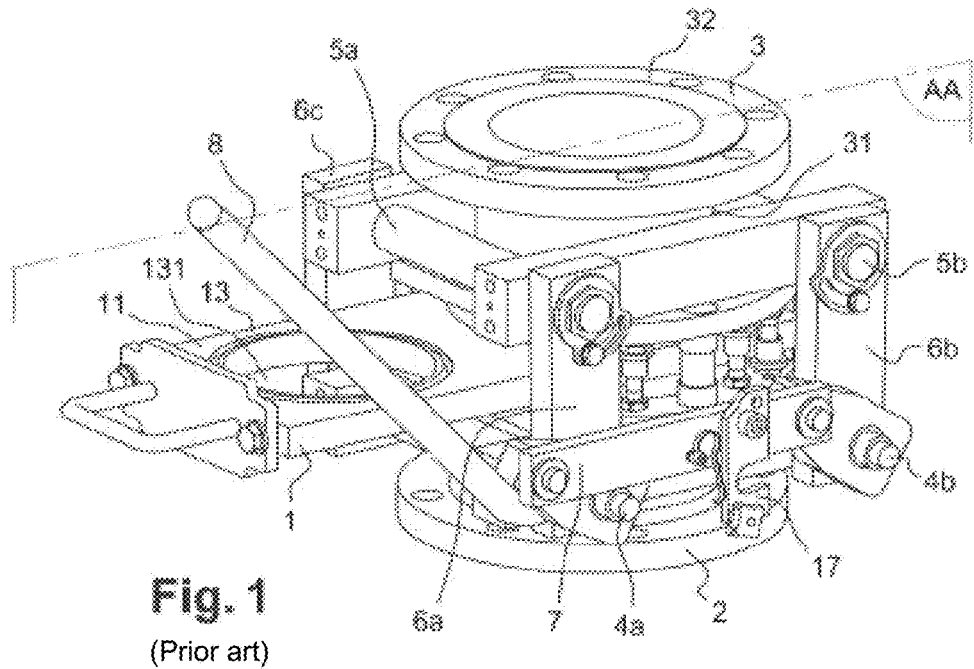
FIG. 1 is a schematic representation of a shutter according to the prior art, in which the flanges are in the separated position.
Figure 2:
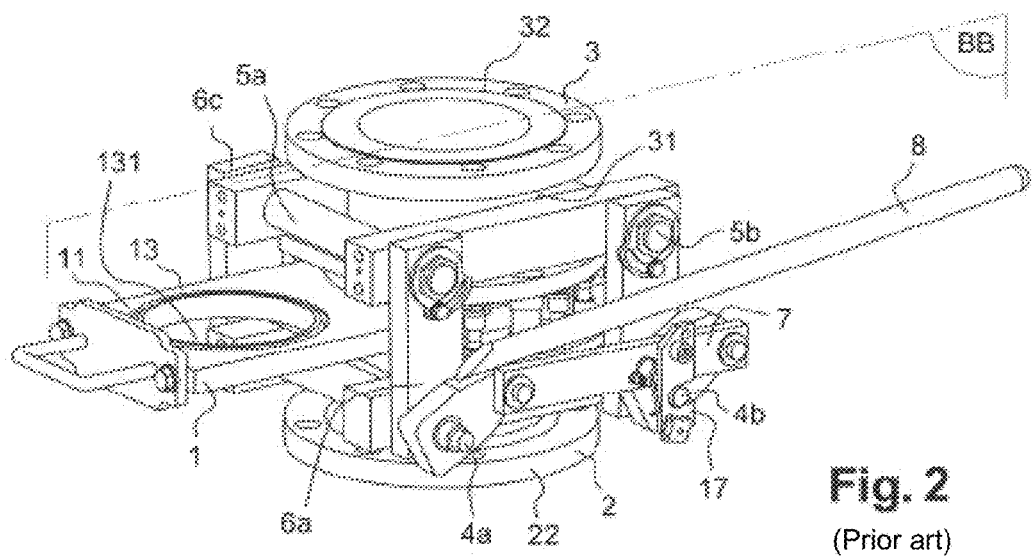
FIG. 2 is a schematic representation of the shutter shown in FIG. 1, in which the flanges are in the close-together position.
Figure 3:
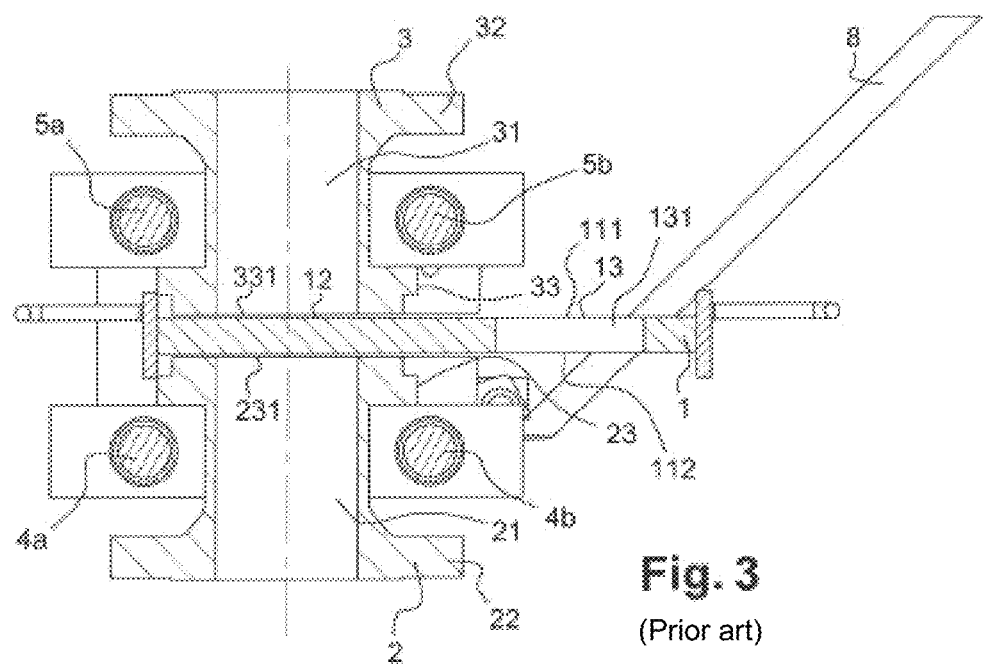
FIG. 3 is a cross-sectional view along line A-A of a shutter according to FIGS. 1 and 2, in which the gate is in the closed position.
Figure 4A:
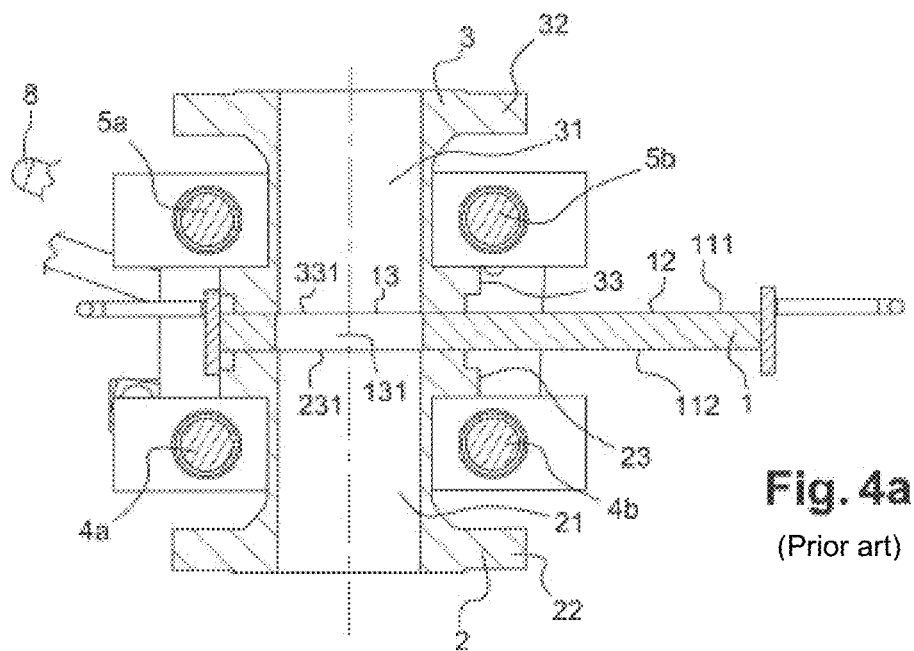
FIG. 4a is a cross-sectional view along line B-B of a shutter according to FIGS. 1 and 2, in which the gate is in the open position.
Figure 4B:
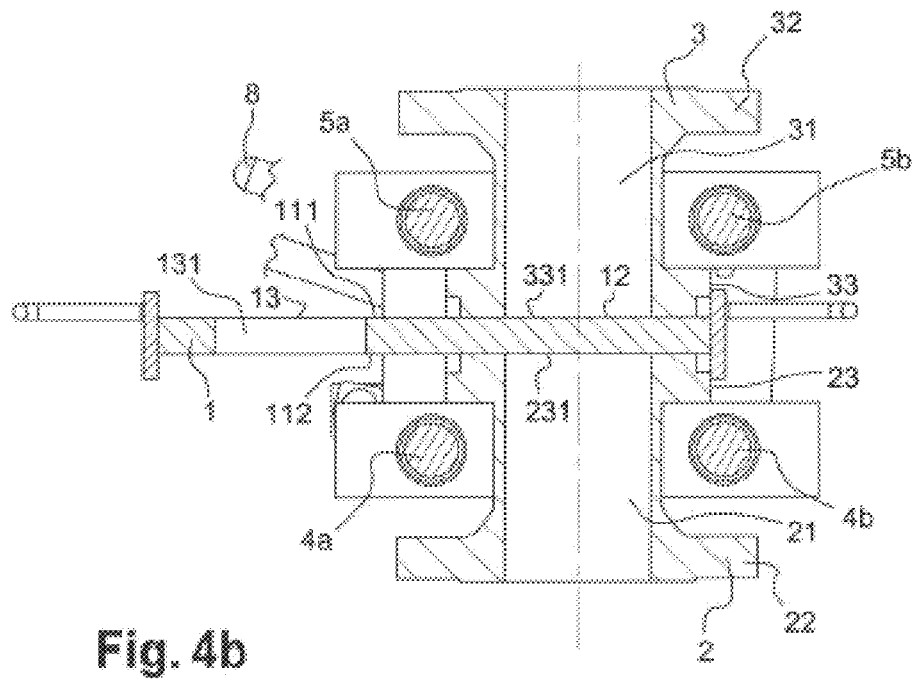
FIG. 4b is a cross-sectional view along line B-B of a shutter according to FIGS. 1 and 2, in which the gate is in the closed position.
Figure 5:
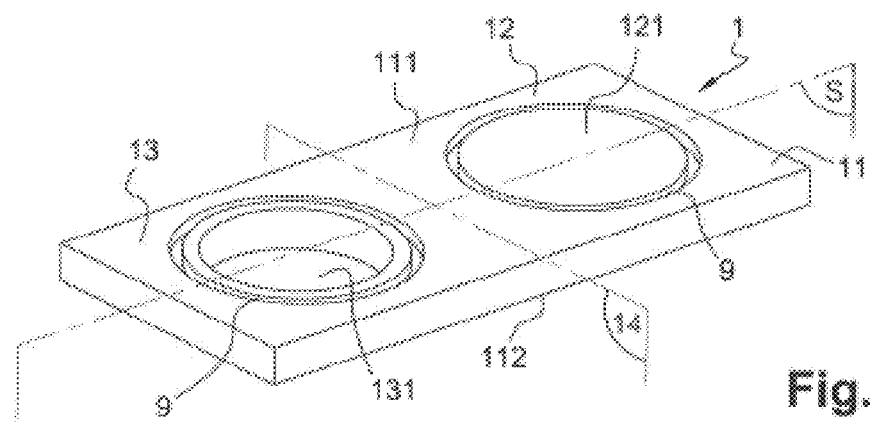
FIG. 5 is a schematic representation of a gate used in the shutter shown in FIG. 1.

For example, the locking mechanism, which is known from the state of the art, may be provided in the form of a latch 17 (shown in FIGS. 1 and 2). It may also be provided in the form of a system that locks the lever 8 after having caused the lever to perform the rotational movement that allows the half-bodies 2, 3 to be brought closer together. In this configuration, the space between the two bearing surfaces 231, 331 corresponds to the thickness of the body 11, but is still less than the combined thickness of the body and of the protruding element 15a. Thus, when the shutter is in the close-together position and when the gate is correctly positioned, the protruding element 15a is located outside the space between the two bearing surfaces 231, 331.

Figure 10:
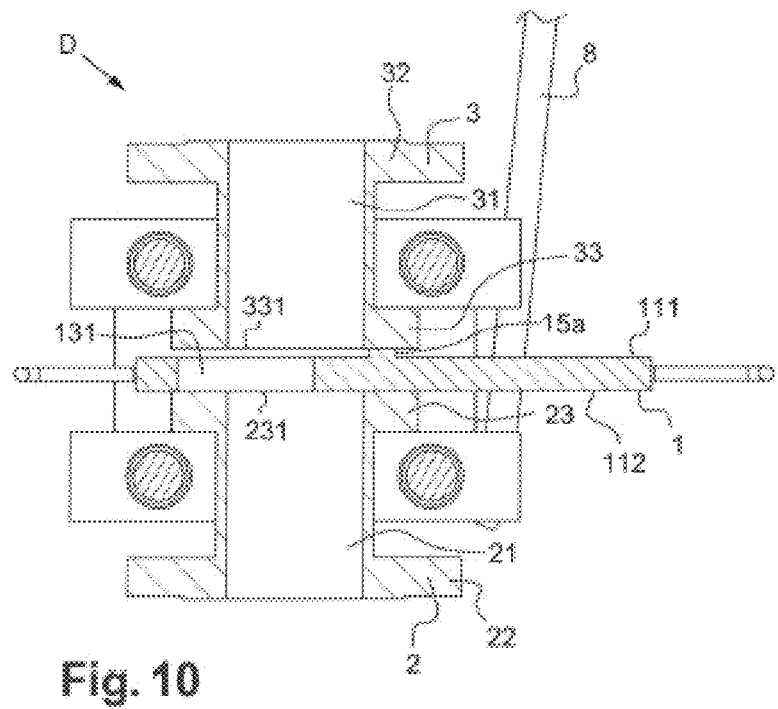
FIG. 10 is a schematic representation of the shutter shown in FIG. 8, in which the gate shown in FIG. 6a is not correctly positioned.

FIG. 10 shows the case in which the gate 1 is incorrectly positioned. Indeed, the protruding element 15a is located in the space between the two bearing surfaces 231, 331 and prevents the plates 23, 33 from reaching their close-together position. Thus, the gate 1 is not clamped between the bearing surfaces 231, 331, because the space between the bearing surfaces is greater than the thickness of the body 11. Consequently, the locking mechanism cannot be locked and keep the plates 23, 33 in their close-together position. As a result, the operator cannot close the shutter unless the gate 1 is shifted until the protruding element 15a is located outside the space between the bearing surfaces 231, 331. The shutter cannot be used unless the gate 1 is in the desired position, such that any potential leaks are prevented.

Second Embodiment (FIGS. 6c, 11, 12a, 12b, and 13)

In this embodiment, the protruding element 15b is provided on the bearing surface 231, 331 of at least one of the plates 23, 33. However, a protruding element 15b may be provided on each of the two bearing surfaces 231, 331.

This protruding element 15b cooperates with a recess 15c provided on the respective longitudinal surface of the body 11 (see FIG. 6c).

In the open closed position (see FIG. 12a), each protruding element 15b is placed and positioned in a corresponding recess 15c whose shape is essentially complementary, thereby allowing the bodies 2, 3 to be brought closer together. In the closed position (see FIG. 12b), each protruding element 15b is placed and positioned in a corresponding recess 15c whose shape is essentially complementary, thereby allowing the bodies 2, 3 to be brought closer together. In the default position (see FIG. 11), each protruding element 15b is placed opposite a surface 111, 112 at a distance from the complementary recess 15c, thereby making it essentially impossible to bring the bodies 2, 3 closer together.

In the embodiment shown in FIGS. 11, 12a, 12b, and 13, the protruding element 15b is positioned on the bearing surface 331 of the plate 33. The recess 15c is provided on the longitudinal surface 111 that is located facing the bearing surface 331. It will readily be understood that the protruding element 15b can be positioned on the bearing surface 231 of the plate 23, in which case the recess 15c is on the corresponding longitudinal surface 112. Protruding elements 15b may also be provided in each of the two bearing surfaces 231, 331, in which case corresponding recesses 15c will be present on each of the longitudinal surfaces 111, 112 of the gate 1.

The protruding element 15b is similar to the element 15a described earlier with reference to the first embodiment, and may have the same shapes and dimensions as the ones shown in FIGS. 7a through 7d.

Similarly, in the same manner described earlier, the protruding element 15b and the plate 33 on whose bearing surface 331 it is provided may be provided in the form of a single piece. Conversely, the protruding element 15b may be affixed to the bearing surface 331, with the protruding element being held in position on the bearing surface by attachment means of the type described earlier.

The dimensions of the recess 15c are equivalent to those of the protruding element (15b), such that the protruding element can be inserted into the recess 15c. However, the dimensions of the recess 15c are preferably larger than those of the protruding element 15b, so as to facilitate the insertion of the protruding element. Thus, the shape of the recess 15c is complementary to that of the protruding element 15b.

The recess 15c is formed in the body 11 of the gate 1, forming a portion that is less thick. It is preferably formed during the manufacture of the gate 1 (for example, during a molding process). However, it may also be formed at a later time, through the use, for example, of a machining, punching, or stamping process.

In FIG. 6c, the recess 15c is located at the center of the body 11, and preferably along the transverse median plane 14. It may be symmetrical in relation to the transverse median plane 14, such that it is equidistant from the solid portion 12 and from the pierced portion 13. It is also symmetrical in relation to the longitudinal median plane (S). However, the recess 15c may be positioned differently, depending on the operator's requirements.

Figure 11:
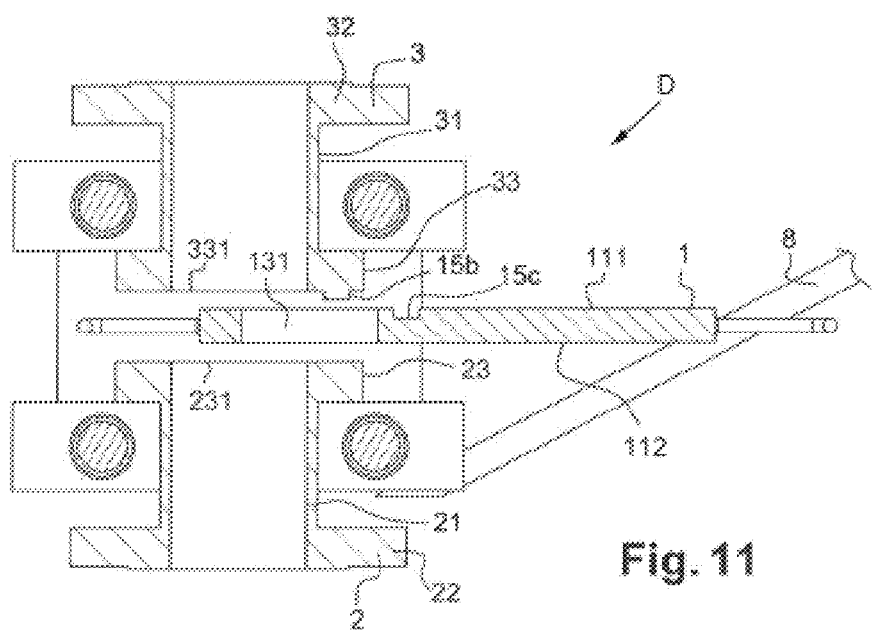
FIG. 11 is a schematic representation of a shutter according to the invention, with the half-bodies in the separated position.

In FIG. 11, the plates 23, 33 are in the separated position. The space between the bearing surfaces 231, 331 is such that the gate 1 can be shifted from the open position to the closed position, or vice-versa. In this separated position, the space between the two bearing surfaces 231 331 is greater than the combined thickness of the protruding element 15b and the body 11. The phrase "thickness of the body" 11 should be understood as referring to the thickness of the part of the body 11 that does not contain the recess 15c.

Figure 12A:
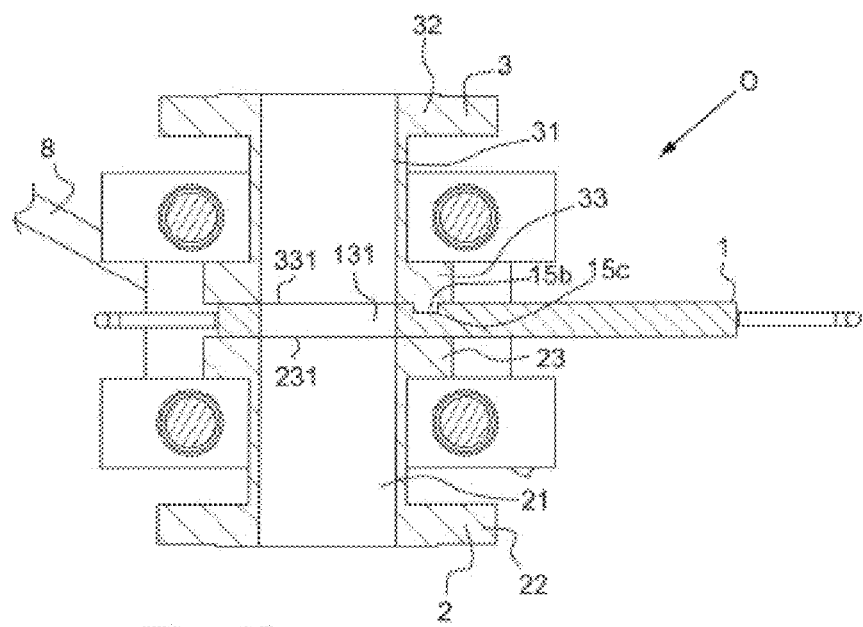
FIG. 12a is a schematic representation of the shutter shown in FIG. 11, in which the half-bodies are in the close-together position and the gate shown in FIG. 6c is in the open position.
Figure 12B:
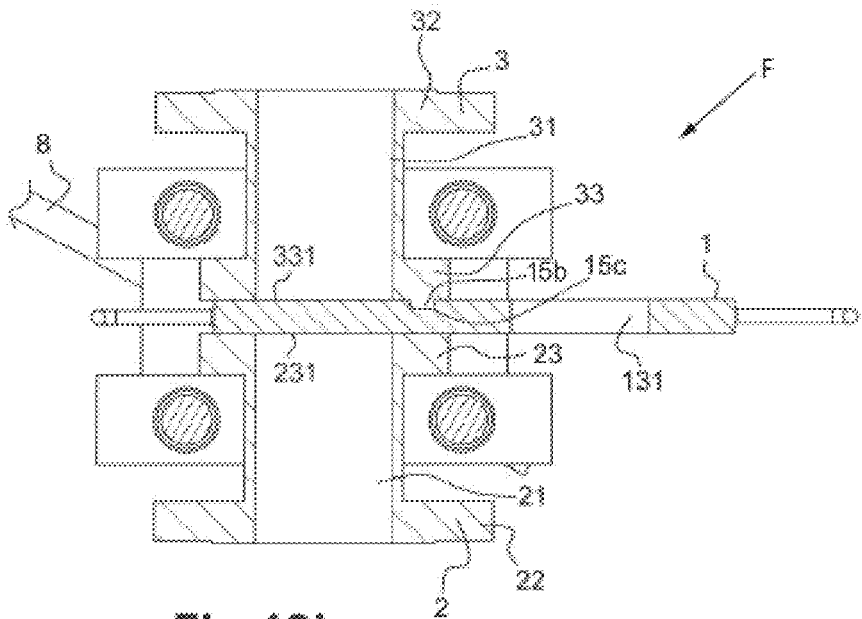
FIG. 12b is a schematic representation of the shutter shown in FIG. 11, in which the half-bodies are in the close-together position and the gate shown in FIG. 6c is in the closed position.

FIGS. 12a and 12b describe the shutter with the plates 23, 33 in the close-together position. In FIG. 12a, the shutter 1 is in the open position, whereas in FIG. 12b it is in the closed position. The bearing surfaces 231, 331 come into contact with the longitudinal surfaces 111, 112 of the gate 1 in such a way as to hold the gate in position.

If the gate 1 is properly positioned (see FIGS. 12a and 12b), the protruding element 15b and the recess 15c are centered, such that the protruding element can be inserted into the recess 15c. The plates 23, 33 can then be shifted until they reach the close-together position in which they clamp the body 11 of the gate 1. In this configuration, in which the protruding element 15b is placed in the recess 15c, the space between the bearing surfaces 231, 331 corresponds to the thickness of the body 11. Consequently, the locking mechanism can be properly locked and keep the plates 2, 3 in this close-together position.

Figure 13:
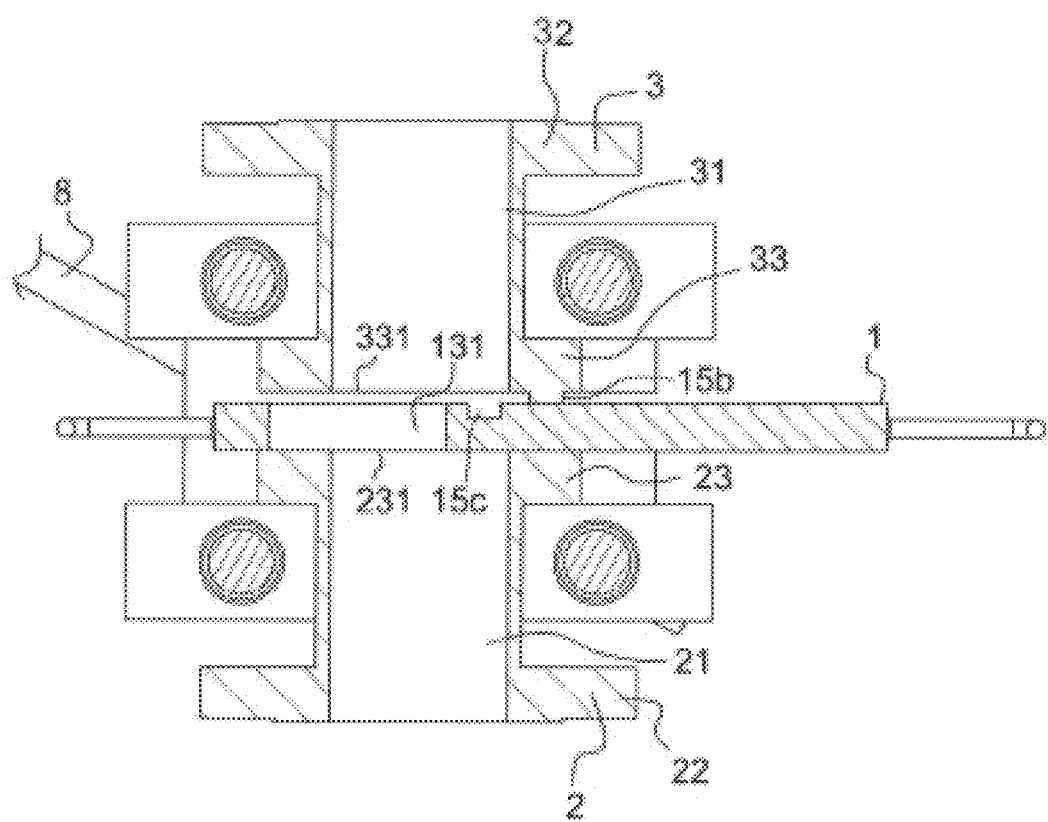
FIG. 13 is a schematic representation of the shutter shown in FIG. 11, in which the gate shown in FIG. 6c is not correctly positioned.

FIG. 13 shows the case in which the gate 1 is incorrectly positioned. Thus, the protruding element 15*b* is offset from the recess 15*c* and abuts the longitudinal surface 111, thereby forming an obstacle. In this case, the space between the two bearing surfaces 231, 331 is greater than the thickness of the body 11, such that the body is not clamped between the bearing surfaces. Consequently, the locking mechanism cannot be properly locked and keep the half-bodies 2, 3 in this close-together position, thereby preventing the operator from closing the shutter.

Figure 14:
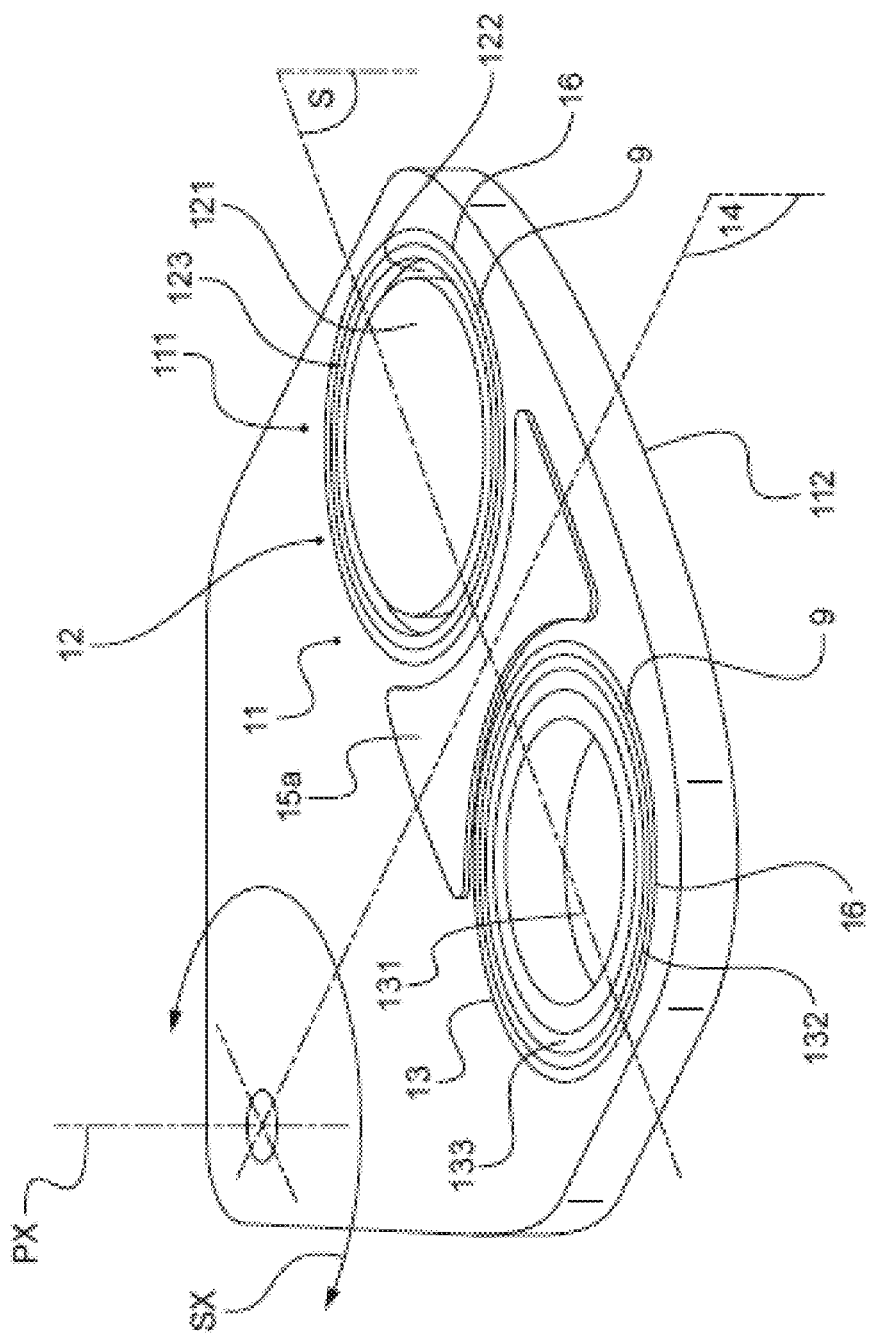
FIG. 14 is a schematic representation of a pivoting shutter according to the invention, shifted along a curvilinear path in its open and closed positions, with the movable gate and/or the body possessing at least one fool-proofing keying relief element that also ensures that the transition from one position to the other can take place only if the spacing between the two half-bodies is sufficient.

FIG. 14 is a schematic representation of a pivoting shutter 1 according to the invention. The shutter 1 can be shifted along a curvilinear path (SX) between its open and closed positions. Here, at least the movable gate 1 and/or one of the half-bodies 2, 3 includes at least one fool-proofing protruding element 15*a*. Each fool-proofing protruding element 15*a* allows a safe transition from one position (open (O) or closed (F)) to the other only if the space between two half-bodies 2, 3 is sufficient.

In these embodiments, the gate 1 is pivotally mounted along a curved direction of rotation (SX) that extends in a plane perpendicular to the longitudinal median plane (S) and the transverse median plane 14. Next, a geometric pivot axis (PX) is perpendicular to the longitudinal surfaces 111, 112 of the body 11.

The layout of the various elements and/or means and/or stages of the invention, in the embodiments described hereinabove, should not be construed as requiring such a layout in all of its implementations. In any event, it should be understood that various changes may be made in these elements and/or means and/or stages without departing from the spirit and scope of the invention. In particular:

the site 121 may be present on one single surface 111, 112 of the gate 1. This embodiment may be used, for example, at the end of a fluid conduit, in order to connect just one of the flanges 2, 3;

the shape of the cross-section of the opening 131 and of the site 121 may differ from the shapes described hereinabove. For example, their cross-section may be square or even rectangular;

the locking mechanism may have a different shape, such as, for example, a reducing device or member actuated by a wheel that forms an integral part of one of the drive shafts 4*a*, 4*b*;

the protruding element 15 may be provided in shapes other than the ones described herein. For example, it may be in the form of a circle, an ellipse, or even a triangle;

the gate 1 may slide between the two plates 23, 33, but may also be pivotally mounted; and the recess 15*c* need not necessarily be located at the center of the body 11. It may be located anywhere, such as, for example, at one end of the body 11.

With reference now to FIGS. 10, 11, 12*a*, and 12*b*, we offer an example of a procedure for the safe and secure sealing of a movable shutter 1 intended for use with a fluid conduit.

In a default position stage (D, as shown in FIG. 10 or FIG. 11), each protruding element 15*b* is placed opposite a surface 111, 112 at a distance from the complementary recess 15*c*, thus preventing the bodies 2, 3 from coming close to each other.

In an opening stage (O, as shown in FIG. 12*a*), at least one protruding element 15*b* is placed and positioned in a corresponding recess 15*c* whose shape is essentially complementary, thereby allowing the bodies 2, 3 to be brought closer together and allowing the fluid to pass through the opening 131.

In a closing stage (F, as shown in FIG. 12*b*), at least one protruding element 15*b* is placed and positioned in a corresponding recess 15*c* whose shape is essentially complementary, thereby allowing the bodies 2, 3 to be brought closer together, so that the fitting 121 or blinding plate halts and prevents the passage of the fluid.

What is claimed is:

1. A movable shutter for a fluid conduit including:
   two half-bodies having a space therebetween, with each of the half-bodies having a tube having a flange at a first end and a plate at a second end, each of the plates having a bearing surface, wherein the half-bodies cooperate to form a fluid conduit,
   a gate in the form of a body defined by two flat facing longitudinal surfaces, each of which is located respectively opposite the bearing surface of the plates, the gate having a solid portion and a portion that is pierced by an opening whose edges are flush with each of the longitudinal surfaces, the gate being mounted movably between the bearing surfaces in the space between the two half-bodies, between:
      a closed position in which the solid portion closes the fluid conduit so as to prevent the flow of fluid between the two half-bodies; and
      an open position in which the pierced portion is placed in the center of the fluid conduit so as to allow the flow of fluid between the two half-bodies,
   a locking mechanism suitable for keeping the plates in:
      a position in which they are separated, in which the bearing surface of the plates is spaced apart from the respective longitudinal surface of the gate, so as to allow the gate to be shifted between the closed and open positions; and
      a position in which they are close together, in which the bearing surfaces clamp together, in a leakproof manner, the body of the gate so as to hold the gate in the open position or in the closed position, with each of the bearing surfaces coming into close contact with the respective longitudinal surface of the gate,
   at least one protruding element made of a rigid material, with the protruding element being configured such that in the close-together position, the space between the two bearing surfaces of the plates is less than the combined thickness of the body and of the protruding element, such that if the gate is not properly positioned in the space between the two half-bodies, in the closed position or in the open position, the protruding element forms an obstacle that keeps the bearing surface of at least one plate away from the respective longitudinal surface, and such that the locking mechanism cannot keep the plates in the position in which they are close together and in which they clamp the body in a leakproof manner,
   wherein the protruding element is provided on at least one of the longitudinal surfaces of the body of the gate, the protruding element is located between the solid portion and the pierced portion of the body, such that if the gate is positioned in such a way that the protruding element is located in the space between the two bearing surfaces of the plates, the protruding element maintains a space between the longitudinal surface on which it is located and the respective bearing surface, and wherein the protruding element is positioned at the center of the body of the gate.

2. The movable shutter according to claim 1, wherein the gate is mounted in such a way that it can slide between the bearing surfaces by sliding in the space between the two half-bodies, along at least one of the longitudinal surfaces of the body of the gate.

3. The movable shutter according to claim 1, wherein the protruding element is symmetrical in relation to the longitudinal median plane of the body of the gate.

4. The movable shutter according to claim 1, wherein the protruding element is symmetrical in relation to the transverse median plane of the body of the gate.

5. The movable shutter according to claim 1, wherein the protruding element is in the shape of an hourglass, with two straight sides that are parallel to the longitudinal edges of the body of the gate, with the straight sides being linked by two curved sides.

6. The movable shutter according claim 1, wherein the protruding element is provided in the form of a transverse rib extending over the entire width of the body of the gate, or substantially over the entire width of the body.

7. The movable shutter according to claim 1, wherein the protruding element is provided in the form of a transverse rib that is located at the center of the body of the gate, and in that the length of the rib is less than the width of the body.

8. The movable shutter according to claim 1, wherein the protruding element is provided in the form of a monoblock forming a single piece with the body of the gate.

9. The movable shutter according to claim 1, wherein the protruding element is affixed to the body of the gate, and in that the protruding element is held in position on the body by attachment means.

10. The movable shutter according to claim 8, wherein the shutter includes a second protruding element.

11. A fluid-treatment facility that includes at least one fluid conduit, characterized in that the facility includes at least one movable shutter according to claim 1.

12. A procedure for the secure closure of a movable shutter for a fluid conduit according to claim 1, wherein:
in a default position stage, the protruding element is placed opposite a complementary surface, thus preventing the bodies from being brought closer together;
in an opening stage, the protruding element is placed and positioned so as to allow the bodies to be brought closer together and to allow the fluid to pass through the opening; and
in a closing stage, the protruding element is placed and positioned so as to allow the bodies to be brought closer together in such a way that the solid portion prevents the passage of the fluid.

13. A movable shutter for a fluid conduit including:
two half-bodies having a space therebetween, with each half-body having a tube having a flange at a first end and a plate at a second end, each of the plates having a bearing surface, wherein the half-bodies cooperate to form a fluid conduit,
a gate in the form of a body defined by two flat facing longitudinal surfaces, each of which is located respectively opposite the bearing surface of the plates, the gate having a solid portion and a portion that is pierced by an opening whose edges are flush with each of the longitudinal surfaces, the gate being mounted movably between the bearing surfaces in the space between the two half-bodies, between:
a closed position in which the solid portion closes the fluid conduit so as to prevent the flow of fluid between the two half-bodies; and
an open position in which the pierced portion is placed in the center of the fluid conduit so as to allow the flow of fluid between the two half-bodies,
a locking mechanism suitable for keeping the plates in:
a position in which they are separated, in which the bearing surface of the plates is spaced apart from the respective longitudinal surface of the gate, so as to allow the gate to be shifted between the closed and open positions; and
a position in which they are close together, in which the bearing surfaces clamp together, in a leakproof manner, the body of the gate so as to hold the gate in the open position or in the closed position, with each of the bearing surfaces coming into close contact with the respective longitudinal surface of the gate,
at least one protruding element made of a rigid material, with the protruding element being configured such that in the close-together position, the space between the two bearing surfaces of the plates is less than the combined thickness of the body and of the protruding element, such that if the gate is not properly positioned in the space between the two half-bodies, in the closed position or in the open position, the protruding element forms an obstacle that keeps the bearing surface of at least one plate away from the respective longitudinal surface, and such that the locking mechanism cannot keep the plates in the position in which they are close together and in which they clamp the body in a leakproof manner,
wherein the protruding element is provided on at least one of the longitudinal surfaces of the body of the gate, the protruding element is located between the solid portion and the pierced portion of the body, such that if the gate is positioned in such a way that the protruding element is located in the space between the two bearing surfaces of the plates, the protruding element maintains a space between the longitudinal surface on which it is located and the respective bearing surface, and
wherein the protruding element is in the shape of an hourglass, with two straight sides that are parallel to the longitudinal edges of the body of the gate, with the straight sides being linked by two curved sides.

14. The movable shutter according to claim 13, wherein the gate is mounted in such a way that it can slide between the bearing surfaces by sliding in the space between the two half-bodies, along at least one of the longitudinal surfaces of the body of the gate.

15. The movable shutter according to claim 13, wherein the protruding element is symmetrical in relation to the longitudinal median plane of the body of the gate.

16. The movable shutter according to claim 13, wherein the protruding element is symmetrical in relation to the transverse median plane of the body of the gate.

17. The movable shutter according to claim 13, wherein the at least one protruding element is provided in the form of a monoblock forming a single piece with the body of the gate.

18. A movable shutter for a fluid conduit including:
two half-bodies cooperating to form a fluid conduit and having a space therebetween, with each of the half-bodies having a tube having a flange at a first end and a plate at a second end, each of the plates having a bearing surface, a gate in the form of a body defined by two facing longitudinal surfaces, each of which is located respectively opposite the bearing surface of the plates, the gate having a solid portion and a portion having an opening whose edges are flush with the longitudinal surfaces, the gate being mounted movably between the bearing surfaces in the space between the two half-bodies, between:
- a closed position in which the solid portion closes the fluid conduit so as to prevent the flow of fluid between the two half-bodies; and
- an open position in which the opening is placed in the fluid conduit so as to allow the flow of fluid between the two half-bodies, the plates being locked in:
- a position in which they are separated, in which the bearing surface of the plates is spaced apart from the respective longitudinal surface of the gate, so as to allow the gate to be shifted between the closed and open positions; and
- a position in which they are close together, in which the bearing surfaces clamp together, in a leakproof manner, the body of the gate so as to hold the gate in the open position or in the closed position, with each of the bearing surfaces coming into contact with the respective longitudinal surface of the gate, at least one protruding element made of a rigid material, with the protruding element being configured such that in the close-together position, the space between the two bearing surfaces of the plates is less than the combined thickness of the body and of the protruding element, such that if the gate is not properly positioned in the space between the two half-bodies, in the closed position or in the open position, the protruding element forms an obstacle that keeps the bearing surface of at least one plate away from the respective longitudinal surface, and such that the plates cannot be kept in the position in which they are close together and in which they clamp the body in a leakproof manner, wherein the protruding element is provided on at least one of the longitudinal surfaces of the body of the gate, the protruding element is located between the solid portion and the opening of the body, such that if the gate is positioned in such a way that the protruding element is located in the space between the two bearing surfaces of the plates, the protruding element maintains a space between the longitudinal surface on which it is located and the respective bearing surface, and wherein the protruding element is positioned at the center of the body of the gate.

* * * * *